United States Patent [19]

Iwamoto et al.

[11] Patent Number: 4,757,244
[45] Date of Patent: Jul. 12, 1988

[54] METHOD AND APPARATUS FOR DETECTING ABSOLUTE POSITION

[75] Inventors: Norihiro Iwamoto; Hiroyuki Tsuboi, both of Zama; Yoshitami Hakata; Kimio Suzuki, both of Numazu, all of Japan

[73] Assignee: Toshiba Kikai Kabushiki Kaisha, Tokyo, Japan

[21] Appl. No.: 870,106

[22] Filed: Jun. 3, 1986

[30] Foreign Application Priority Data

Jun. 7, 1985 [JP] Japan .................. 60-123984

[51] Int. Cl.$^4$ .............................. G05G 1/00
[52] U.S. Cl. .................... 318/652; 318/653; 318/687
[58] Field of Search ............... 318/652, 653, 687, 135, 318/654, 655; 336/131, 132, 134

[56] References Cited

U.S. PATENT DOCUMENTS

| | | | |
|---|---|---|---|
| 3,083,324 | 3/1963 | Wolff | 318/653 |
| 3,504,246 | 3/1970 | Russell | 318/652 |
| 3,505,576 | 4/1970 | Burkhart | 318/653 |
| 4,589,038 | 5/1986 | Radtke | 318/653 |

Primary Examiner—Bentsu Ro
Attorney, Agent, or Firm—Koda and Androlia

[57] ABSTRACT

A rod member provided with magnetic and non-magnetic portion arranged alternatingly is provided and a plurality of detecting heads for detecting magnetic resistance are disposed along the longitudinal direction of the rod member with predetermined distances, respectively. The pitches of the respective pairs of the magnetic and non-magnetic portions are arranged with pitches different with each other by the predetermined distances. Output signals transmitted from the detecting heads in accordance with the relative movement between the rod member and the detecting heads are detected by phase detectors, and on the basis of the detected signals, the predetermined operation is carried out in an operation processing unit thereby to obtain the absolute positional relation between the rod member and the detecting heads in, for example, of a positioning system such as in a die casting machine.

13 Claims, 9 Drawing Sheets

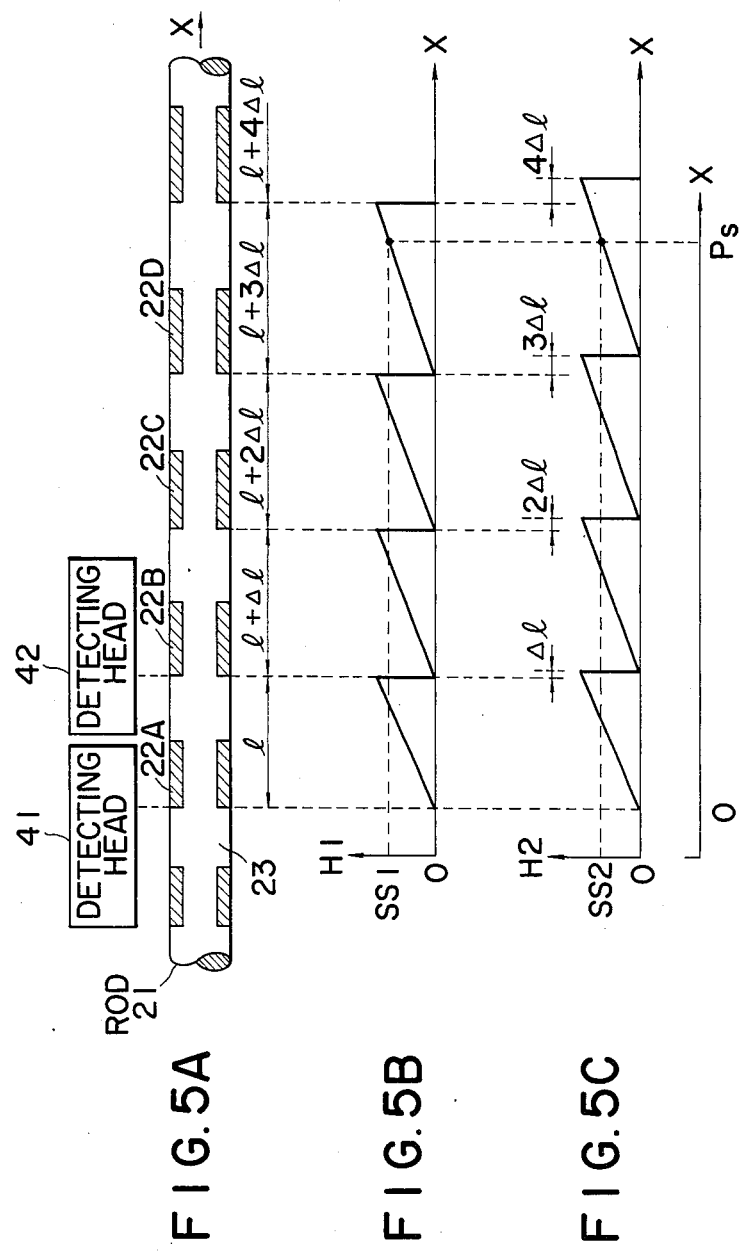

FIG. 6
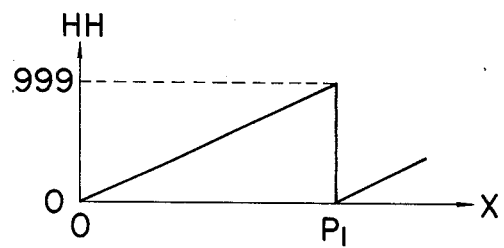
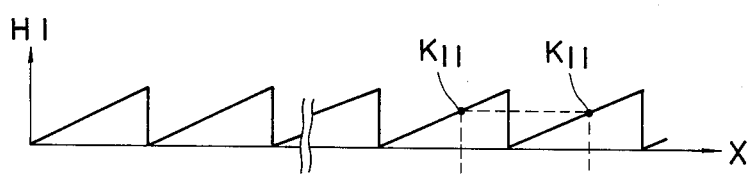
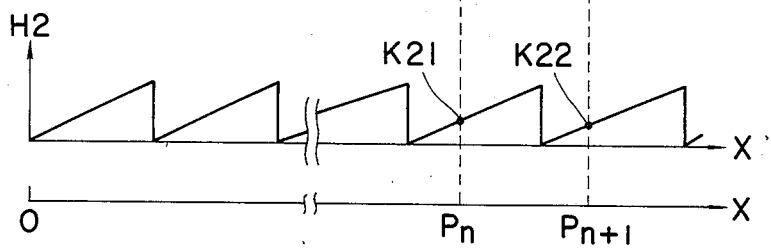

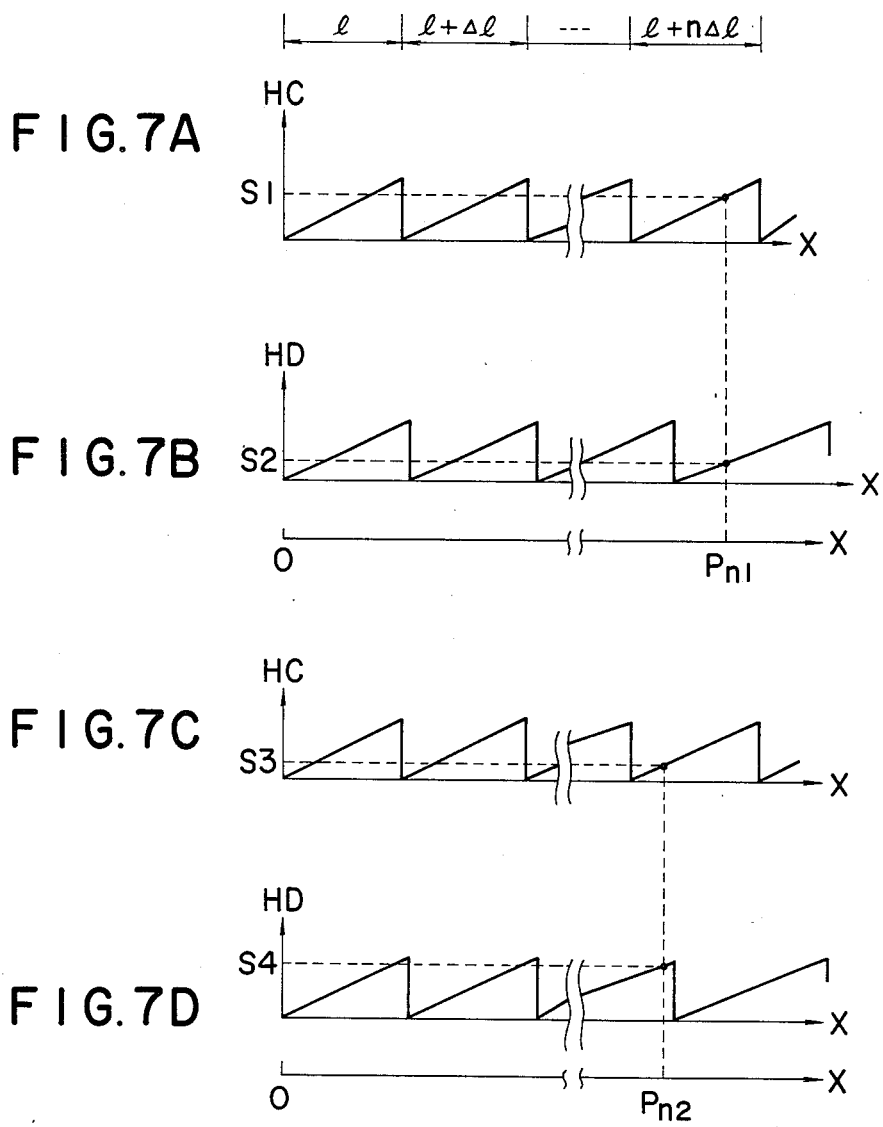

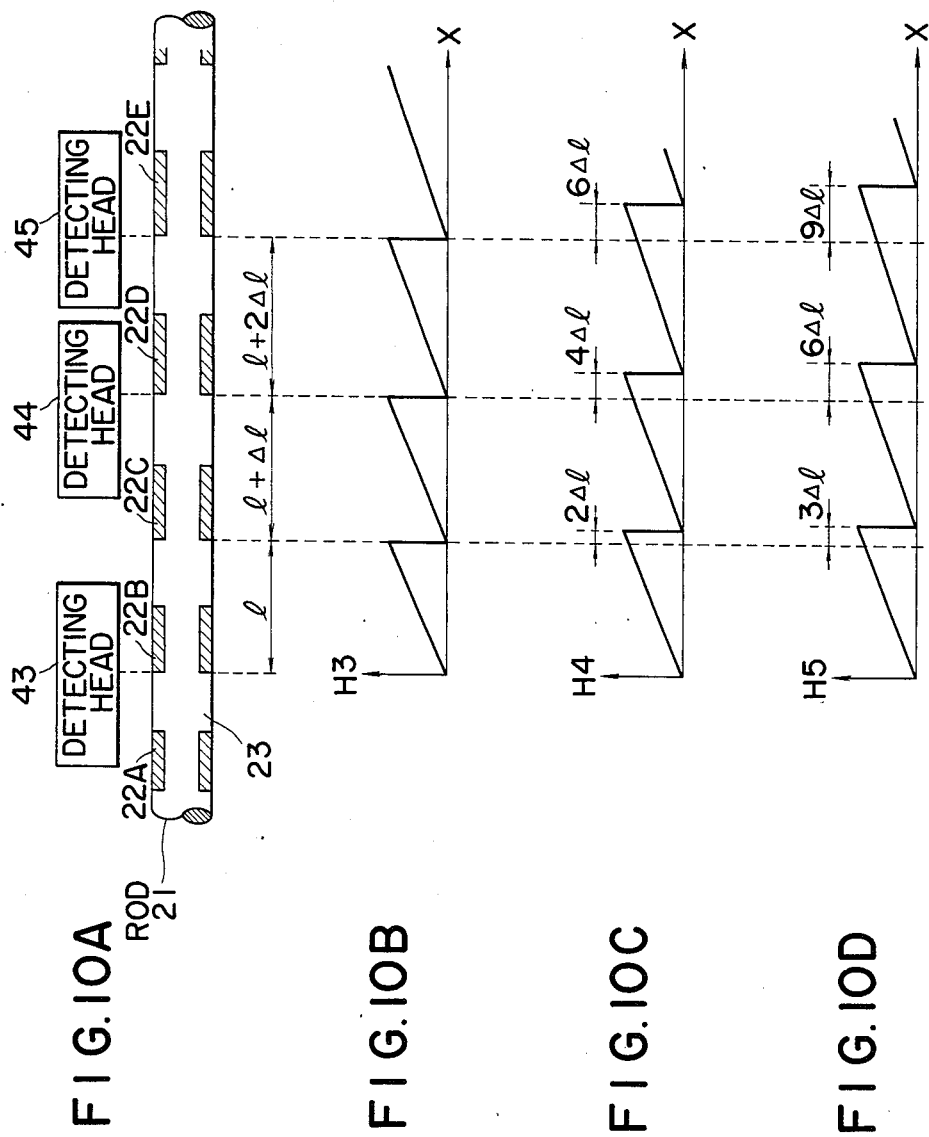

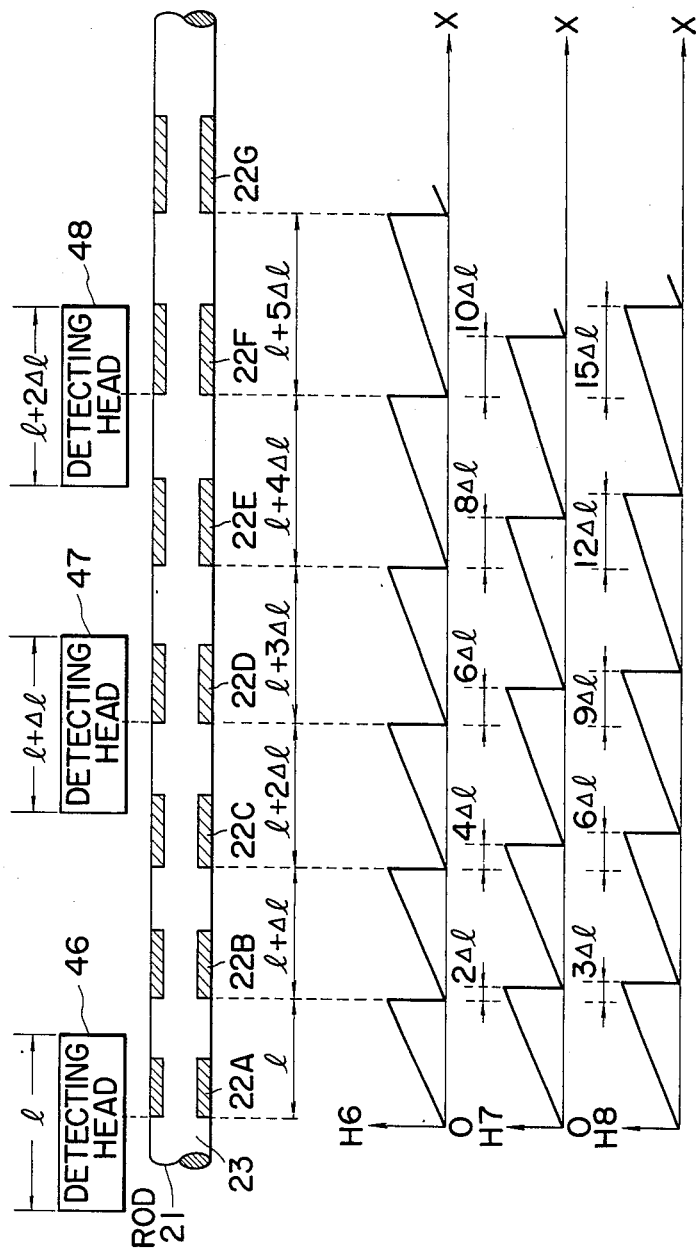

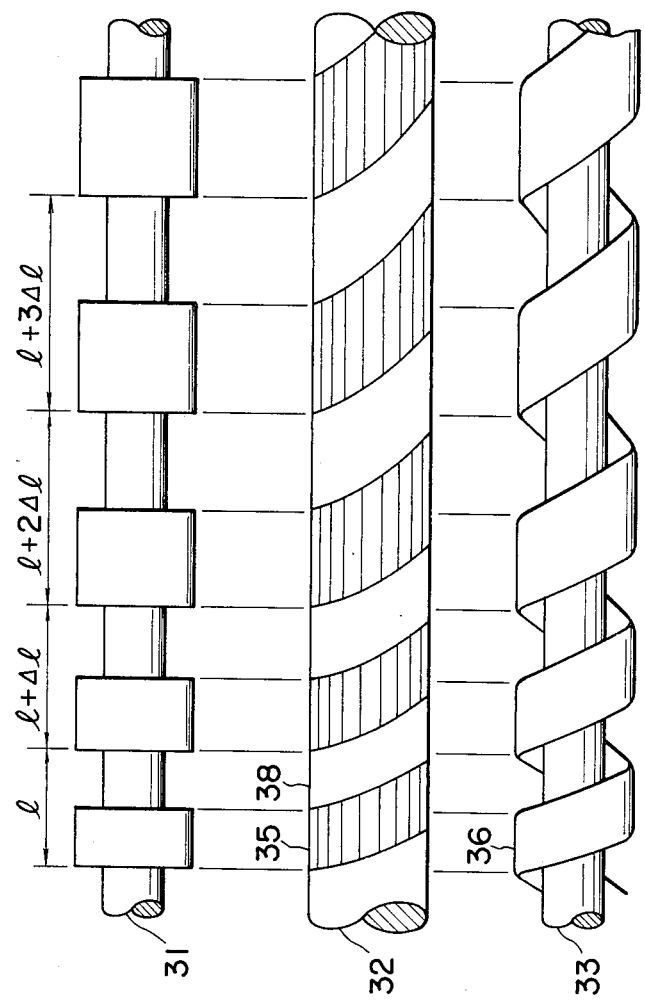

METHOD AND APPARATUS FOR DETECTING ABSOLUTE POSITION

BACKGROUND OF THE INVENTION

This invention relates to a method and apparatus for detecting an absolute position of a rod member used for a positioning system in a machine such as a machine tool and a die casting machine.

FIG. 1 shows a schematic diagram of a position detecting means as the most important portion for a positioning system of a machine such as a machine tool and a die casting machine. Referring to FIG. 1, a plurality of magnetic materials 2 and the non-magnetic materials 3 are formed or arranged coaxially and alternatingly with equal pitches P on the outer or inner peripheral surface of a movable cylindrical rod 1. Primary excitation coils 6A and 6B and secondary induction coils 5A and 5B are coaxially located respectively in magnetic shield cores 10A and 10B which are located in a cylindrical detecting head portion 4 stationary and arranged so as to surround the rod 1. When the primary coils 6A and 6B are excited with an alternating current provided with phases I·sin ωt and I·cos ωt, respectively, the magnetic resistance is changed every one pitch in accordance with the movement of the rod 1 in the axial direction by the alternating arrangement of the magnetic materials 2 and the non-magnetic materials 3. The change of the magnetic resistance results in an induced potential change to the secondary induction coils 5A and 5B and an induced electromotive force E is expressed as follows.

$$E = K \cdot \sin\left(\omega t - 2\pi \frac{X}{P}\right) \tag{1}$$

where
K: Conversin coefficient,
X: Moving distance of rod,
P: Pitch
In view of the phase $$\left(2\pi \frac{X}{P}\right)$$

in this equation (1) it is found that only the moving distance X of the rod 1 is phase-shifted in comparison with the phase I·sin ωt in the primary excitation. Accordingly, the moving distance X is obtained by detecting the phase difference between these phases and taking out the phase difference as signal EO representing an electric potential.

According to the unit shown in FIG. 1, however, the absolute distance can be obtained only in a case where the moving distance X of the rod 1 is within the range of one pitch P thereof. Namely, since the moving distance X is obtained only by an incremental form, when the moving distance X is over one pitch P, a quasi-absolute distance can be obtained by integrating the outputted potential signal EO, FIG. 2 shows a variation of the potential signal EO and the horizontal axis of the graph shown in FIG. 2 represents the moving distance X and the vertical axis thereof represents the level of the potential signal EO, which is outputted repeatedly every one pitch. The absolute position is thus detected by integrating the outputted potentials; but at the starting time of the movement of the rod, the integrated amount has been reset, so that the absolute position can not be detected. For this reason, in the conventional technique, it is restricted that the rod 1 should be absolutely returned to the original reference position at the starting time of the rod movement.

FIG. 3 shows another example of a device for detecting the absolute position without having the restriction described above. In this device, parallelly arranged rods 1A and 1B are integrated so as to be both movable in their longitudinal, i.e. axial directions and detecting heads 4A and 4B are located near the rods 1A and 1B, respectively. The rod 1A is provided with a plurality of magnetic materials 2A and non-magnetic materials 3A alternatingly and the rod 1B is also provided with a plurality of the magnetic materials and the non-magnetic materials 3B. In this example, the rods 1A and 1B are constructed so that the pitch PA between one pair of the materials 2A and 3A is different from the pitch PB between one pair of the materials 2B and 3B, and accordingly the detecting heads 4A and 4B detect different electric potentials EO1 and EO2 as shown in FIGS. 4A and 4B when the rods 1A and 1B are moved together. The absolute position can be detected by the combination of the potentials EO1 and EO2. In this device, however, it is required to locate the two rods 1A and 1B and the two detecing heads 4A and 4B, and this arrangement makes the whole structure of the device large, thus being expensive and not economical.

SUMMARY OF THE INVENTION

An object of this invention is to improve the defects or disadvantages of the prior art technique for detecting an absolute position of a movable member in a positioning system and to provide an effective method and a small apparatus for easily and at a low cost detecting the absolute position by means of using only one rod member according to the improved arrangement of the rod member and detecting heads with high operation precision.

Another object of this invention is to provide rod members which are capable of using as a member of absolute detecting means and which have various arrangements of magnetic portions and non-magnetic portions in connection with the location of a plurality of detecting heads.

According to this invention, these and other objects can be achieved by providing a method for detecting an absolute position including the steps of preparing a rod member on which magnetic and non-magnetic materials are alternatingly arranged along a longitudinal direction of the rod and with pitches which are varied by predetermined lengths along that direction, locating a plurality of detecting heads along and in parallel with the longitudinal direction of the rod, the detecting heads being separated from each other with predetermined spaces, detecting phase signals transmitted from the detecting heads in response to variation of magnetic resistance caused by relative movement between the rod and the detecting heads in longitudinal direction thereof, performing a predetermined operation in accordance with the detected phase signals, and obtaining an absolute positional relationship between the rod and the detecting heads on the basis of a result of the predetermined operation.

This invention also provides, for achieving the same purposes, an apparatus for detecting an absolute position including a rod member and a plurality of detecting heads of the types described directly herein above, a unit operatively connected to the detecting heads for detecting phases of output voltages from the detecting heads, and a unit operatively connected to the phase detecting unit for processing an operation in response to the output voltages from the detecting heads, thereby to detect an absolute positional relation between the rod and the detecting heads.

Another aspect of this invention, there are also provided rod members which are capable of using as a member of absolute detecting means and which have various arrangements of magnetic and non-magnetic portions.

The nature, principle and utility of the invention will become more apparent from the following detailed description when read in cojunction with the accompanying drawings.

BRIEF DESCRIPTION OF THE DRAWINGS

In the accompanying drawings:

FIGS. 5A through 5C and FIG. 6 respectively show schematic views of an arrangement of a rod and detecting heads and graphs explaining the operation analysis of the arrangement according to this invention;

FIGS. 7A through 7D and FIGS. 8A and 8B show graphs which represent the relationship between the rod moving amount and phase detecting voltages based on the arrangement according to this invention;

FIGS. 10A through 10D respectively show an arrangement of a rod and detecting heads for detecting an absolute position according to this invention and graphs explaining an operation analysis of this arrangement;

FIGS. 11A through 11D show another arrangement of a rod and detecting heads of this invention and graphs which explain an operation analysis of this arrangement; and FIGS. 12A through 12C show rod members which have various structures which are applicable to this invention, respectively.

DESCRPTION OF THE PREFERRED EMBODIMENT

Figure 1:
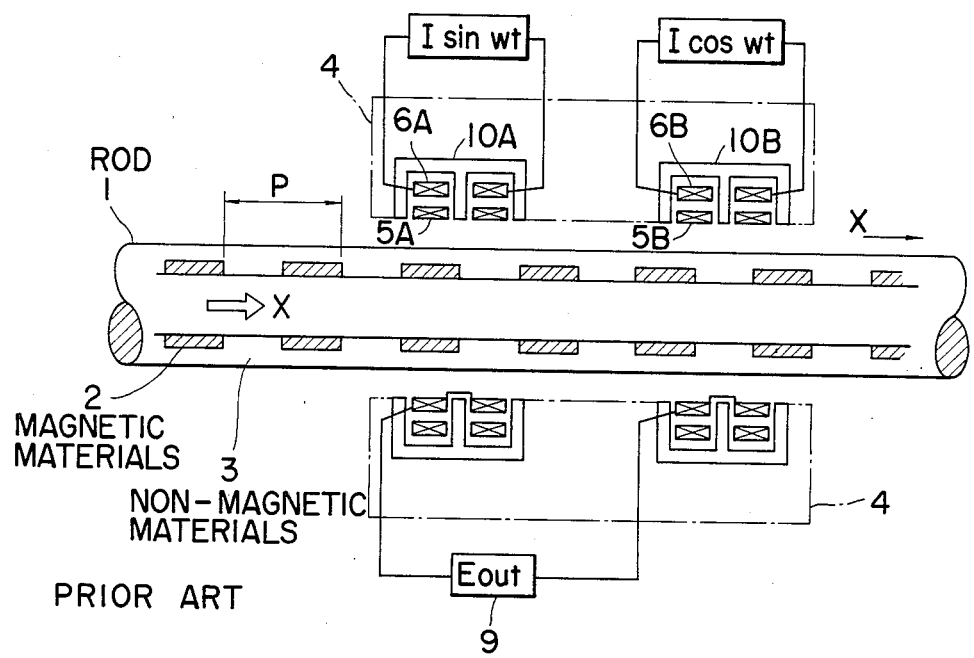
FIG. 1 is a schematic view which shows a conventional arrangement of a rod and detecting heads for detecting an absolute position.
Figure 2:
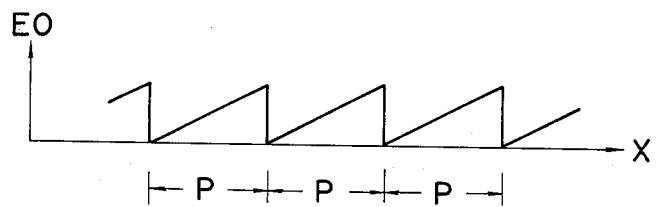
FIG. 2 shows a graph which explains an operation analysis of the arrangement shown in FIG. 1.
Figure 3:
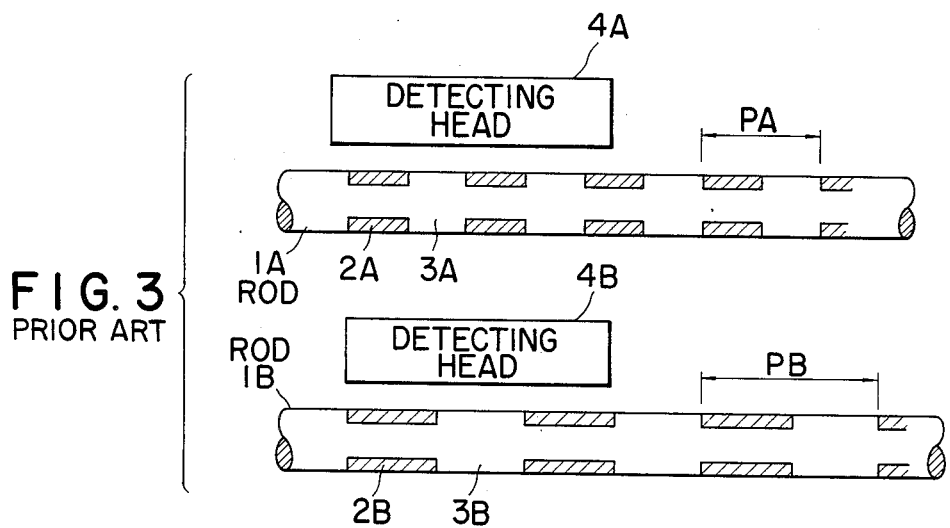
FIG. 3 is schematic view which shows another conventional arrangement of the rod 5 and the detecting heads.
Figure 4A:
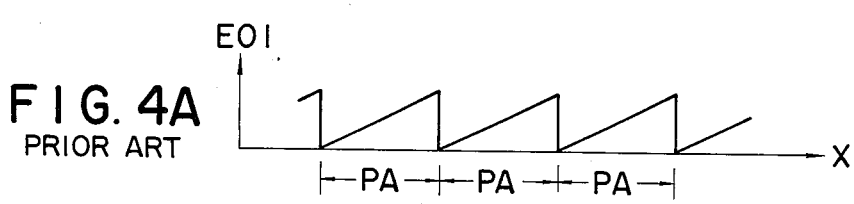
FIGS. 4A and 4B show graphs which explain operation analysis of the arrangement shown in FIG. 3.
Figure 4B:
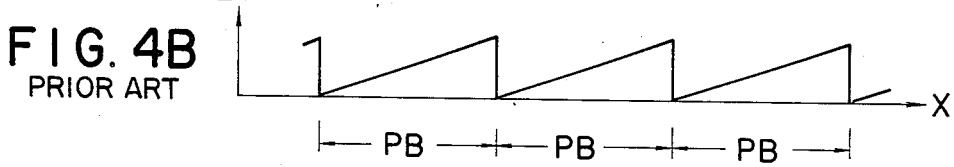

FIGS. 5A through 5C are analytic views to be used for explaining the operation of a rod 21, generally having a circular cross section, based on the method of this invention, and referring to FIG. 5A, a plurality of magnetic materials 22A,22B,22C . . . and non-magnetic portions 23 are alternatingly arranged on the outer peripheral surface of the rod 21 along the longitudinal direction thereof and the pitch of the respective paired magnetic and non-magnetic materials are minutely and successively increased by an increment $\Delta l$ as represented by l, l+$\Delta l$, l+2$\Delta l$, . . . . The detecting heads 41 and 42 for detecting magnetic resistance are disposed in parallel with the rod 21 and in a spaced relation with each other by the distance l, i.e. The pitch distance, and primary and secondary excitation coils are wound in pairs around the detecting heads 41 and 42 such as described with referene to FIG. 1. FIGS. 5B and 5C show respectively phase detection voltages H1 and H2 detected as phase components of induced electromotive forces for the secondary coils of the detecting heads 41 and 42 with respect to the moving distance X of the rod 21. As is understood from FIGS. 5B and 5C, the period of the output H1 of FIG. 5B is different by a distance corresponding to the interval of the pitch l of the detecting heads 41 and 42 in comparison with the output H2 of FIG. 5C, thus causing the differences $\Delta l$, 2$\Delta l$, 3$\Delta l$ . . . in the pitches. For this reason, for instance, when comparing the output voltages at the moving distance Ps, the phase detection valtage H1 of the detecting head 41 represented by SS1, which is different from the phase detection voltage H2, being represented by SS2, of the detecting head 42.

Supposing now that one pitch is divided into one thousand numbers, the phase detection voltage HH obtained by the detecting head is converted into "0" through "999" as shown in FIG. 6, and in that case, the moving distance Ps will be obtained as the following equation (2) or expression.

$$Ps = l + (l + \Delta l) + (l + 2\Delta l) + \frac{l + 3\Delta l}{1000} \times (SS1) \qquad (2)$$
$$= 3 \times (l + \Delta l) + \frac{l + 3\Delta l}{1000} \times (SS1)$$

With reference to the equation (2) and regarding the output characteristics of the phase detection voltages HC and HD of the detecting heads 41 and 42 represented by graphs of FIGS. 7A through 7D, a general equation of the moving distance Pn1 (or Pn2) will be expressed as follows.

$$Pn = n\left(l + \frac{n-1}{2} \cdot \Delta l\right) + \frac{l + n \cdot \Delta l}{1000} \cdot S \qquad (3)$$

where
Pn: Moving distance of rod 21,
n: Rod 21 passing pitch number,
S: Phase detection output potential at the moving distance.

The moving distance Pn1 is expressed as follows when detected by the detecting head 41 on the basis of the equation (3).

$$Pn_1 = n\left(l + \frac{n-1}{2} \cdot \Delta l\right) + \frac{l + n \cdot \Delta l}{1000} \cdot S1 \qquad (4)$$

In the similar manner, the distance Pn1 will be expressed as follows when detected by the detcting head 42.

$$Pn_1 = n\left(l + \Delta l + \frac{n-1}{2} \cdot \Delta l\right) + \frac{l + \Delta l + n \cdot \Delta l}{1000} \cdot S2 \qquad (5)$$
$$= n\left(l + \frac{n+1}{2} \cdot \Delta l\right) + \frac{l + (n+1)\Delta l}{1000} \cdot S2$$

Since the moving distances $Pn_1$ in the equations (4) and (5) are in general equal to each other, the following relation or expression (6) will be established.

$$n\left(l + \frac{n-1}{2} \cdot \Delta l\right) + \frac{l + n \cdot \Delta l}{1000} \cdot S1 = \qquad (6)$$

$$n\left(l + \frac{n+1}{2} \cdot \Delta l\right) + \frac{l + (n+1)\Delta l}{1000} \cdot S2$$

$$S1 = \frac{l + (n+1) \cdot \Delta l}{l + n \cdot \Delta l} \cdot S2 + \frac{n \cdot \Delta l}{l + n \cdot \Delta l} \times 1000$$

Although the equation (6) is obtained with respect to the moving distance $Pn_1$ under the detected voltage condition represented by the graphs of FIGS. 7A and 7B, it is necessary in reality to consider conditions represented by the graphs of FIGS. 7C and 7D. Refering to the graphs of FIGS. 7C and 7D, the moving direction $Pn_2$ will be expressed as follows as the equation (7) by substituting the value S1 in the equation (4) with the value S3 and as the equation (8) by substituting the values n and S2 in the equation (5) with the values (n−1) and S4, respectively. Where the values S3 and S4 are phase detection voltage values given by the detecting heads 41 and 42.

$$Pn_2 = n\left(l + \frac{n-1}{2} \cdot \Delta l\right) + \frac{l + n \cdot \Delta l}{1000} \cdot S3 \qquad (7)$$

$$Pn_2 = (n-1)\left(l + \frac{n}{2} \cdot \Delta l\right) + \frac{l + n \cdot \Delta l}{1000} \cdot S4 \qquad (8)$$

Accordingly, the following equation or expression (9) will be established.

$$S3 = S4 - \frac{l}{l + n \cdot \Delta l} \times 1000 \qquad (9)$$

Consequently, the pitch number n can be obtained by optionally selecting the equation (6) or (9) with the values or amounts S1 to S4, l and Δl, which are preliminarily known. In other words, the absolute value of the moving distance X of the rod 21 can be obtained from the thus obtained pitch number n. The pitch number n is obtained by subsequently substituting n=0, 1, 2, ... into the equations (6) or (9) and finding the pitch number n by which the equality of the equations (6) or (9) is established.

In this stage, it may be necessary to consider the fact as to whether or not the equations (6) and (9) are satisfied with another value or solution other than the solution n. Supposing now that one solution of the value n is calculated from the equation (6) as $n = n_o$, i.e. that the following equation (10) is established;

$$S1 = \frac{l + (n_o + 1) \cdot \Delta l}{l + n_o \cdot \Delta l} \cdot S2 + \frac{n_o \cdot \Delta l}{l + n_o \cdot \Delta l} \times 1000 \qquad (10)$$

Supposing also that the another solution of the value n, is obtained from the equation (6) as $n = m (m \neq n_o)$, the following equation (11) will be established.

$$S1 = \frac{l + (m+1) \cdot \Delta l}{l + m \cdot \Delta l} \cdot S2 + \frac{m \cdot \Delta l}{l + m \cdot \Delta l} \times 1000 \qquad (11)$$

In these equations (10) and (11), the values S1 and S2 should be equated, and accordingly, the following equation (12) will be esatablished with respect to the value S1.

$$\begin{aligned} S1 &= \frac{l + (n_o + 1) \cdot \Delta l}{l + n_o \cdot \Delta l} \cdot S2 + \frac{n_o \cdot \Delta l}{l + n_o \cdot \Delta l} \times 1000 \\ &= \frac{l + (m+1) \cdot \Delta l}{l + m \cdot \Delta l} \cdot S2 + \frac{m \cdot \Delta l}{l + m \cdot \Delta l} \times 1000 \end{aligned} \qquad (12)$$

Accordingly, the value S2 is obtained as follows.

$$S2 = \frac{l}{\Delta l} \times 1000 \qquad (13)$$

In comparison with the pitch distance l and the minute increment Δl, the following equation (14) will be of course understood, $$l > \Delta l \qquad (14)$$

and as described before with reference to FIG. 6, the phase detection voltage S2 of the detecting head will satisfy the following relation.

$$0 \leq S2 < 1000 \qquad (15)$$

The value S2 of the equation (13) is of course above 1000 as shown hereunder, $$S2 = \frac{l}{\Delta l} \times 1000 > 1000 \qquad (13)'$$

and the equation (13)' is in conflict with the fact of the equation (15). This conflict proves that the assumption of the existance $n = m (\neq n_o)$ is erroneous one, and accordingly this reveals the fact that the value n in the equation (6) has only one solution. It will be easily understood from this fact that the value n in the equation (9) has also only one value, i.e. one solution.

As described hereinbefore, it is found that the equation (6) or (9) have only one solution with respect to the pitch numbers, i.e. n in this case, and in the next step, it will be necessary to refer to the degree of the calculation precision with which the calculation of the pitch numbers n should be performed in a case where the calculation is done by the successive interation method described hereinbefore, and in this invention, this matter is referred to with reference to graphs regarding the output voltages shown in FIGS. 8A and 8B. Referring to the graphs of FIGS. 8A and 8B, the output H1 of the detecting head 41 is designated by a value $K_{11}$ when the rod 21 moves by pitch number n; that is, the rod moving amount X designates the distance Pn, and when the rod 21 moves by pitch number (n+1), the output H2 of the detecting head 42 is designated by values $K_{21}$ and $K_{22}$ corresponding to the values $K_{11}$, $K_{11}$ at the distances Pn and Pn+1. Accordingly, it will be found that the difference between the values $K_{21}$ and $K_{22}$ is the precision to be obtained. Supposing now that the value S2 is designated $K_{21}$ and $K_{22}$ for pitch numbers of n and (n+1), respectively, the equation (6) will be expressed as follows.

$$\frac{l + (n + 1) \cdot \Delta l}{l + n \cdot \Delta l} \cdot K_{21} + \frac{n \cdot \Delta l}{l + n \cdot \Delta l} \times 1000 = \quad (16)$$

$$\frac{l + (n + 2) \cdot \Delta l}{l + (n + 1) \cdot \Delta l} \cdot K_{22} + \frac{(n + 1) \cdot \Delta l}{l + (n + 1) \cdot \Delta l} \times 1000$$

With this equation (16), when the pitch number n approaches the maximum value, the following equation (17) will be estabtished.

$$\frac{\Delta l}{l + n \cdot \Delta l} \approx \frac{\Delta l}{l + (n + 1) \cdot \Delta l} \quad (17)$$

Accordingly, the equation (16) will be alternatively expressed as follows.

$$K_{21} - K_{22} = \frac{\Delta l \cdot l}{\{l + (n + 1) \cdot \Delta l\}^2} \times 1000 \quad (16)'$$

In an actual calculation is use of concrete numerical values such as, $$\left. \begin{array}{l} l = 2000 \ \mu m \\ \Delta l = 40 \ \mu m \end{array} \right\} \quad (18)$$

where $$n_{max} = \frac{l}{\Delta l} = 50$$

When the values of the condition (18) are introduced into the above equation (3), the moving distance Pn of the rod 21, i.e. detectable maximum absolute position $P_{n \cdot max}$, will be expressed as follows.

$$P_{n \cdot max} = 50 \cdot \left( 2000 + \frac{50 - 1}{2} \cdot 40 \right) + \frac{2000 + 50 \cdot 40}{1000} \cdot S \quad (19)$$

$$\approx 15 \ (cm) \quad (20)$$

When the condition (18) is applied to the equation (16)′, the equation (16)′ is calculated as follows.

$$K_{21} - K_{22} = \frac{40 \cdot 2000}{\{2000 + (50 + 1) \cdot 40\}^2} \cdot 1000 \quad (21)$$

$$\approx 5 \ (pulses) \quad (22)$$

According to these equations and calculations it is found that the detectable meximum absolute position of the rod 21 is 15 cm under the condition (18); namely, in the case where the minimum resolution of the rod moving amount X is 40 μm, the distance of one pitch l is 2000 μm and the pitch number n is 50. When it is required to obtain or calculate the absolute position Ps of the rod 21, it will be necessary to first obtain the pitch number n by the secussive iteration method in use of the equation (6) to which is applied the phase detection voltages S1 and S2 of the detecting heads 41 and 42 or the equation (9) to which is applied the phase detection voltages S3 and S4. In this method, it is found that the obtained pitch number n is a correct value by discriminating the equality of the equation (6) (or the equation (9)) with an error range below 5 pulses as obtained by the equation (22).

Figure 9:
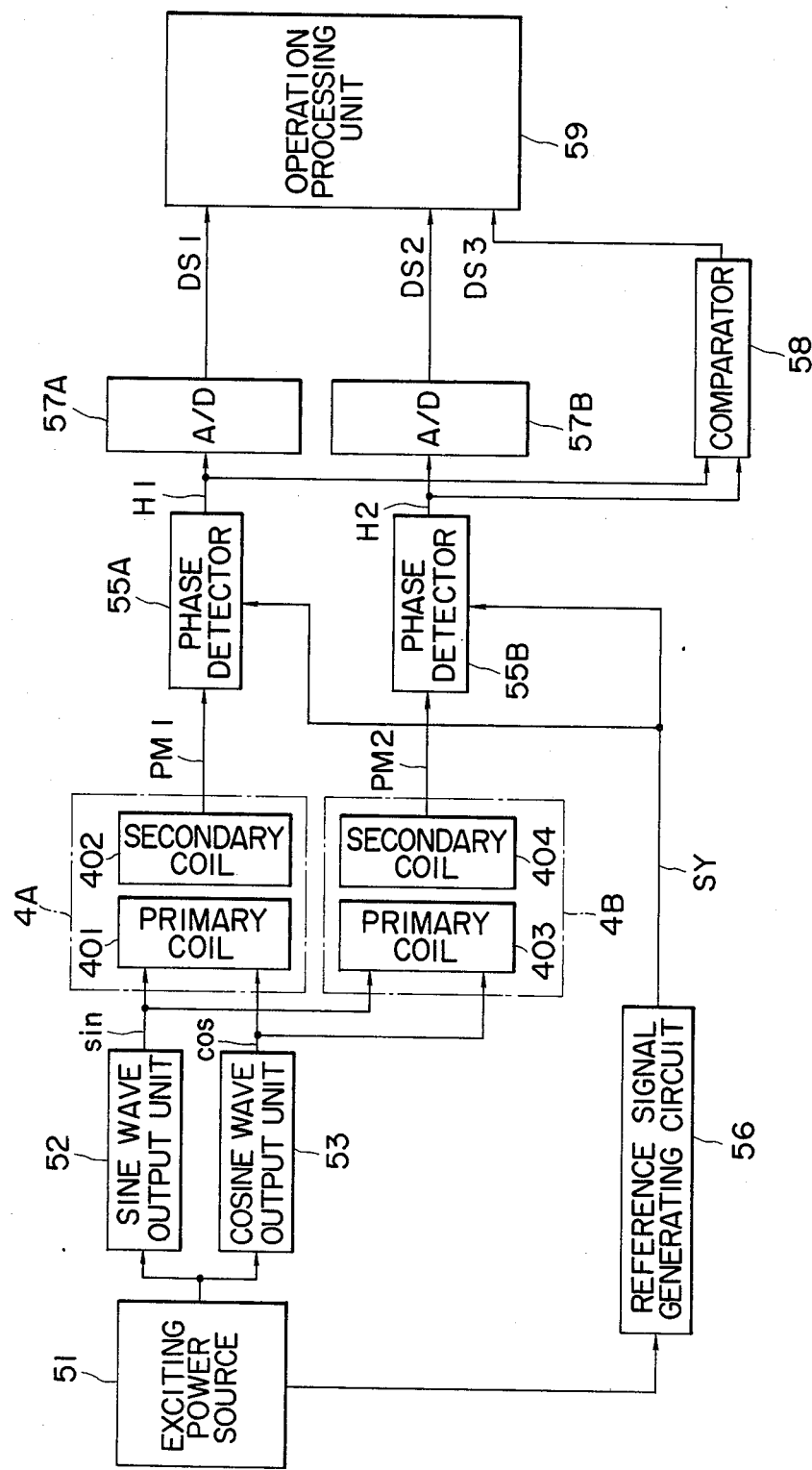
FIG. 9 is a block diagram which shows an example of arrangement of the apparatus according to this invention.

FIG. 9 is a block diagram representing one embodiment of an apparatus for carrying out the method described hereinbefore according to this invention. Referring to FIG. 9, an exciting power source 51 is operatively connected to a sine wave output unit 52 generating a sine wave signal and a cosine wave output unit 53 generating a cosine wave signal, and the sine wave signal and the cosine wave signal outputted from the output units 52 and 53 are transmitted to the primary coils 401 and 403 of the detecting heads 41 and 43, respectively. Phase-modulated output signals PM1 and PM2 obtained from the secondary coils 402 and 404 are respectively inputted into phase detectors 55A and 55B to which is applied an output signal SY from a reference signal generating circuit 56 in synchronism with the exciting power source 51 thereby to carry out the phase detection. The phase detection signals H1 and H2 from the phase detectors 55A and 55B are inputted into analog-to-digital (A/D) converters 57A and 57B in which the phase detection signals H1 and H2 are converted into digital signals DS1 and DS2, respectively, which are then inputted into an operation processing unit 59 which comprises a micro computer and so on. The phase detection signals H1 and H2 are also inputted into a comparator 58 from the phase detectors 55A and 55B to discriminate the fact as to which one of the signals H1 and H2 is larger in the levels and then to transmit the discriminated signal DS3 from the comparator 58 into the operation processing unit 59. In this embodiment, the phase detection outputs H1 and H2 of the phase detectors 55A and 55B are in parallel digitalized by the A/D converters 57A and 57B, but the outputs H1 and H2 may be outputted selectively by locating a selector through which the output pass, and in the latter case, the selected one output is digitalized by only one A/D converter.

The operation of the apparatus having construction shown in FIG. 9 will be explained hereunder with reference to FIGS. 5A through 5C.

As described hereinbefore, the magnetic materials 22A, 22B, 22C ... and the non-magnetic portions 23 are alternatingly and coaxially disposed on the outer peripheral surface of the rod 21, and as also described with reference to FIG. 1, the output voltages having modulated phases are generated on the secondary coils 5A and 5B as represented by the equation (1) by adding the sine and cosine wave voltages to the primary coils 6A and 6B of the detecting heads. In the similar manner, when the phase-modulated output signals PM1 and PM2 generated from the secondary coils 402 and 404 of the detecting heads 41 and 42 are inputted into the phase detectors 55A and 55B, the phase detection voltages H1 and H2 shown in FIGS. 5B and 5C are outputted.

When it is now required to obtain the absolute position in a case where the rod 21 moves from the position 0 to the position Ps (i.e. X:0→Ps), the pitch number n is obtained by first substituting the values SS1 and SS2 for the values S1 and S2 in the equation (6). In the next step, when the thus obtained pitch number n and S=SS1 are introduced into the equation (3), the moving distance Pn is calculated as the absolute position Ps. In these steps, since these operations or caluculations are carryied out by digital processing, the phase detection signals H1 and H2 are inputted into the A/D converters 57A and 57B to digitally convert the same, and the thus obtained digital output signals DS1 and DS2 are inputted into the operation processing unit 59. With the example shown in FIGS. 5A and 5B, since value SS1 is larger than the value SS2 (SS1>SS2), i.e. H1>H2, the discrimination signal DS3 reaches, for example, "H" level to thereby instruct to operate the equation (6). On the other hand, in case the positional relationship shown in the graphs of FIGS. 7C and 7D, the relation between the values H1 and H2 to be measured becomes H1A<H2, so that the discrimination signal DS3 is represented by "L" level for example, to thereby instruct to operate the equation (9).

FIGS. 10A through 10D show another embodiment of this invention in which three detecting heads 43, 44 and 45 to improve the operation precision, and accordingly, this embodiment will be available and effective for rendering easy the operations. The detecting heads 44 and 45 are located at positions apart from the detecting head 43 by distance corresponding to two and three pitches, respectively, as shown in FIG. 10A, and FIGS. 10B, 10C and 10D show graphs representing the phase detection voltages H3, H4 and H5 of the detecting heads 43, 44 and 45, respectively. As illustrated, in this embodiment, the differences of the pitches increase gradually in the arranged order of the respective phase detection voltages H3, H4 and H5 so that the operation can be made easily.

FIGS. 11A through 11D show a further embodiment according to this invention, in which three detecting heads 46, 47 and 48 are also arranged as shown in FIG. 10A, but at positions different from those shown in FIG. 10A. Namely, in FIG. 11A, the detecting heads 47 and 48 are positioned apart from the detecting head 46 by the distances corresponding to three pitches and five pitches, respectively. The detecting heads 46, 47 and 48 of this embodiment have longitudinal lengths l, (l+Δl) and (l+2Δl), respectively, so that the potential differences between the phase detection output voltages H6, H7 and H8 increase gradually in the arranged order as shown in FIGS. 11B through 11D. Thus, the operation is further made easy and the operation precision is also improved. With the illustrated embodiment, although, for the easy understanding of this invention, the detecting heads 46, 47 and 48 located at the specific positions so that the phases of the respective voltages are in accord with each other at the starting position of the moving distance X of the rod 21, the absolute position can be detected even if the detecting heads 46, 47 and 48 are located at optional position for the reason that the phases are found on the basis of the phase detection voltages H6, H7 and H8 outputted by the respective detecting heads 46, 47 and 48 in accordance with the mutual positional relationships therebetween. In the foregoing description, although all the operations or calculations are dealt with in the assumption that the phase detection voltages change linearly; strictly speaking, these voltages do not linearly change in an actual operation. It will be therefore required to correct them in actual oeration, to operate them by approximating them to be a linear, or to carry out the operation based on the required precision.

FIGS. 12A to 12C are examples of a rod for showing arrangements of the magnetic material and the non-magnetic material on the rod. The rod 31 of FIG. 12A is made of a magnetic material and a plurality of air gaps are formed as non-magnetic portions at positions having longitudinal widths l/2, (l+Δl)/2, (l+2Δl)/2, (l+3Δl)/3, ... as illustrated in FIG. 12A. The rod 31 of this type is produced with low cost. Referring to FIG. 12B, a magnetic material 35 is spirally wound up around the rod 32 so as to have an increased width rightwardly as viewed in FIG. 12B and a non-magnetic material 38 is formed between the respective spirals of the magnetic material 35. Such technique as winds the magnetic material around the rod member is made possible by producing a plastic made magnetic material in the recent technical development. FIG. 12C shows a further example of the rod 33 made of magnetic material 36 so as to have a spiral groove having a longitudinal width increasing gradually rightwardly. The air gap of the sprial groove is formed as non-magnetic portions which are arranged alternatingly with respect to the magnetive portions 36 of the rod 33. The grooves, i.e. air gaps, shown in FIGS. 12A and 12C may be filled with a non-magnetic material to make smooth the outer peripheral surfaces of the rods 31 and 33 respectively. With the examples shown in FIGS. 12A through 12C, although the magnetic portion and the non-magnetic portion are arranged in equal ratio of areas, the alternation of this ratio is easily made in the present working technique and is of course within the scope of this invention.

In addition, it will be easily understood by those skilled in the art that this invention is applicable to a linear magnet scale as well as and also in the foregoing, although the exciting signal is referred to as a sine wave (or cosine wave), signals having other wave shapes such as square waves, triangular waves or the like.

According to the method and apparatus of this invention, an absolute position can be relatively easily measured or operated by the simple construction with low cost using a rod member on which magnetic portions and non-magnetic portions are alternatingly arranged with various patterns.

It should be understood that many modifications and adaptations of the invention will become apparent to those skilled in the art and it is intended to encompass such obvious modifications and changes in the scope of the claims appended hereto.

What is claimed is:

1. A method for detecting an absolute position of a movable member comprising the steps of:
    preparing a rod as the movable member on which magnetic and non-magnetic materials are alternatingly arranged along a longitudinal direction of the rod with pitches which are varied by predetermined lengths along the longitudinal direction thereof;
    locating a plurality of detecting heads along and in parallel with the longitudinal direction of said rod, said detecting heads being separated from each other with predetermined spaces;
    detecting phase signals transmitted from said detecting heads in response to variation of magnetic resistance which is caused by a relative movement between said rod and said detecting heads in the longitudinal direction thereof;
    performing a predetermined operation in accordance with the detected phase signals; and
    obtaining an absolute positional relationship between said rod and said detecting heads on the basis of a result of said predetermined operation.

2. The method according to claim 1, wherein said pitches are gradually increased by an increment Δl so that said pitches are expressed as l, l+Δl, l+2Δl, ... and said detecting heads comprise first and second detecting heads which are located with a space l corresponding to the length of the first pitch.

3. The method according to claim 2, wherein two operation equations are prepared and levels of the phase signals transmitted from said first and second detecting heads are compared with each other so that said two operation equations are selectively utilized in accordance with the compared result.

4. The method according to claim 2, wherein when said phase signals from said first and second detecting heads are designated by letters S1 and S2 and the number of pitches passing the detecting heads is represented by a letter n, a following equation is established $$S1 = \frac{l + (n + 1) \cdot \Delta l}{l + n \cdot \Delta l} \cdot S2 + \frac{n \cdot \Delta l}{l + n \cdot \Delta l} \times 1000$$

or $$S1 = S2 - \frac{l}{l \cdot n \cdot \Delta l} \times 1000$$

5. The method according to claim 4 wherein the number n is obtained by a successive iteration method.

6. The method according to claim 1, wherein said pitches are gradually increased by an increment $\Delta l$ so that said pitches are expressed as $l, l+\Delta l, l+2\Delta l, \ldots$ and said detecting heads comprise a first detecting head, a second detecting head apart from said first detecting head by a distance $(2l+\Delta l)$ and a third detecting head apart from said first detecting head by a distance $(3l+3\Delta l)$.

7. The method according to claim 1, wherein said pitches are gradually increased by an increment $\Delta l$ so that said pitches are expressed as $l, l+\Delta l, l+2\Delta l, \ldots$ said detecting heads comrise a first detecting head, a second detecting head apart from said first detecting head by a distance $(3l+3\Delta l)$ and a third detecting head apart from said first detecting head by a distance $(5l+10\Delta l)$, and said first detecting head has a longitudinal length $l$, said second detecting head has a longitudinal length $(l+\Delta l)$ and said third detecting head has a longitudinal length $(l+2\Delta l)$.

8. An apparatus for detecting an absolute position of a movable member, comprising:
a rod member provided at predetermined positions with plural pairs of magnetic and non-magnetic materials with pitches which vary by predetermined lengths along a longitudinal direction of said rod;
a plurality of detecting heads located in parallel with said rod in the longitudinal direction thereof;
means operatively connected to said detecting heads for detecting phases of output voltages from said detecting heads; and
means operatively connected to said phase detecting means for processing an operation in response to the output voltages from said detecting heads, thereby to detect an absolute positional relation between said rod member and said detecting heads.

9. The apparatus according to claim 8, wherein said detecting heads comprise first and second detecting heads and said phase detecting means comprises first and second phase detectors, and said pitches are gradually increased by an increment $\Delta l$ so that said pitches are expressed as $l, l+\Delta l, l+2\Delta l, \ldots$.

10. The apparatus according to claim 9, wherein the operation processing means is provided with a first and a second analog-to-digital converters so as to process a digitized input and wherein the first and second analogy-to-digital converters are connected to said first and second phase detectors respectively to digitize outputs therefrom and then to transmit digitized outputs from said analog-to-digital converters into said operation processing means.

11. The apparatus according to claim 9, wherein the operation processing means processes a digitized input and wherein a selector is operatively connected to said first and second phase connectors to select one of phase signals from said phase detectors and an analog-to-digital converter connected to said selector to digitize an output from said selector, and then to transmit a digitized output from said analog-to-digital converter into said operation processing means.

12. The apparatus according to claim 9, wherein the operation processing means has a function which executes below two equations:

$$S1 = \frac{l + (n + 1) \cdot \Delta l}{l + n \cdot \Delta l} \cdot S2 + \frac{n \cdot \Delta l}{l + n \cdot \Delta l} \times 1000$$

and $$S1 = S2 - \frac{l}{l \cdot n \cdot \Delta l} \times 1000$$

in which S1 and S2 designate phase signals from said first and second detecting heads and a letter n represents the number of pitches passing said detecting heads and, said operation processing means further includes a comparing means for selecting one of said two equations in comparison with outputs from said first and second phase detectors.

13. A rod adapted for detecting an absolute position, said rod being single and relatively movable with respect to a plurality of detecting heads disposed along and in parallel with an axial direction of said rod and being provided with magnetic portions and non-magnetic portions alternately in the axial direction of said rod with pitches which are varied by a length $\Delta l$, respectively, wherein said rod has a circular outer configuration and said magnetic and non-magnetic portions are formed spirally on an outer peripheral surface of said rod so that said pitches are successively varied on the peripheral surface.

* * * * *